Aug. 2, 1949.　　　　　O. OSTEN　　　　　2,477,703
SELECTIVE INKING MEANS FOR
TICKET PRINTING MACHINES

Filed Aug. 25, 1944　　　　　　　　　　2 Sheets-Sheet 1

INVENTOR.
Oscar Osten.
BY
A. E. Wilson.
ATTORNEY.

Aug. 2, 1949.  O. OSTEN  2,477,703
SELECTIVE INKING MEANS FOR
TICKET PRINTING MACHINES
Filed Aug. 25, 1944  2 Sheets-Sheet 2
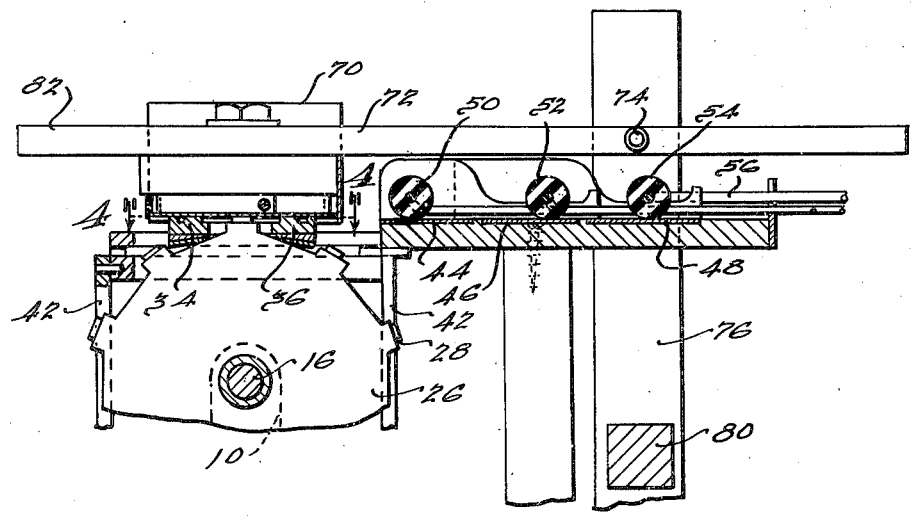
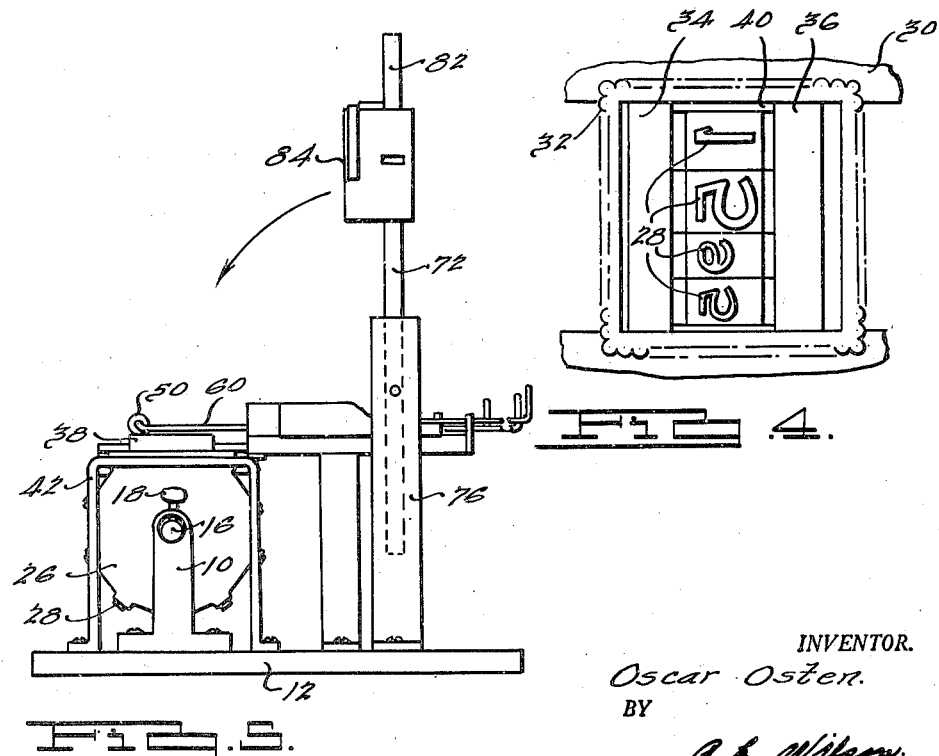
INVENTOR.
Oscar Osten.
BY
A. E. Wilson
ATTORNEY.

Patented Aug. 2, 1949

2,477,703

UNITED STATES PATENT OFFICE 2,477,703

SELECTIVE INKING MEANS FOR TICKET PRINTING MACHINES

Oscar Osten, Detroit, Mich.

Application August 25, 1944, Serial No. 551,139

1 Claim. (Cl. 101—203)

This invention relates to the art of printing, and more particularly to an improved light weight machine for printing price tickets in varying amounts and in different colors for use in stores to provide artistic cards conforming with color schemes in show windows, etc.

In the retail stores it is necessary to have a large supply of price tags to mark the prices of articles ranging in selling price through rather wide limits. It is customary for a retail store to have on hand a large supply of price tickets for use in indicating the price of various articles. This method of handling the problem has not been entirely satisfactory because of the confusion and loss resulting from the use of a large number of price tickets having different selling prices marked thereon.

In the merchandising of certain articles such for example as ladies dresswear it is desirable that the price tickets match in color with the articles to which they are applied or be of such a color as not to clash therewith. In many retail stores it is therefore necessary to have price tickets available in several different colors throughout the range of prices of the various articles. This need has resulted in considerable confusion in the preparation and use of price tickets, particularly during times when seasonal changes force a quick disposal of articles and necessitate changing prices to dispose of articles that do not move readily.

An object of this invention is therefore to provide a light weight economical price ticket printing machine that can be carried about in a store to permit printing the desired price ticket in appropriate color and price combinations when needed.

Another object of the invention is to provide a price ticket printer having a plurality of independently movable wheels having numerals thereon which may be readily set to permit making a price ticket indicating any desired sales price when needed.

A further object of the invention is to provide a portable printing machine wherein varying colors may be selectively employed to form price tickets in desired colors.

Yet a still further object of the invention is to provide a light weight printing machine that can be manufactured economically to permit the making of price tickets in varying amounts and in desired colors whenever needed.

Another object of the invention is to provide a manually actuated price ticket printer for printing price tickets having artistic designs surrounding price indicating figures and wherein the name of the store or the origin of the goods may be indicated.

Yet a still further object is to provide a price ticket printer of light weight construction that can be carried into a store window to permit making price tickets in desired amounts and in correct colors at the time the window is being trimmed.

Other objects and advantages of this invention will be apparent from the following detailed description considered in connection with the accompanying drawings, submitted for purposes of illustration only, and not intended to define the scope of the invention, reference being had for that purpose to the subjoined claim.

In the drawings wherein similar reference characters refer to similar parts throughout the several views:

Fig. 4 is a plan view of the marking wheel and card decorating mat taken substantially on the line 4—4 of Fig. 3, looking in the direction of the arrows.

Fig. 5 is a side elevation on a reduced scale generally similar to Fig. 1 showing the device in a different operating position than is illustrated in Fig. 1.

Fig. 6 is a fragmentary plan view showing the relation of the ink roller guides.

Figure 1:
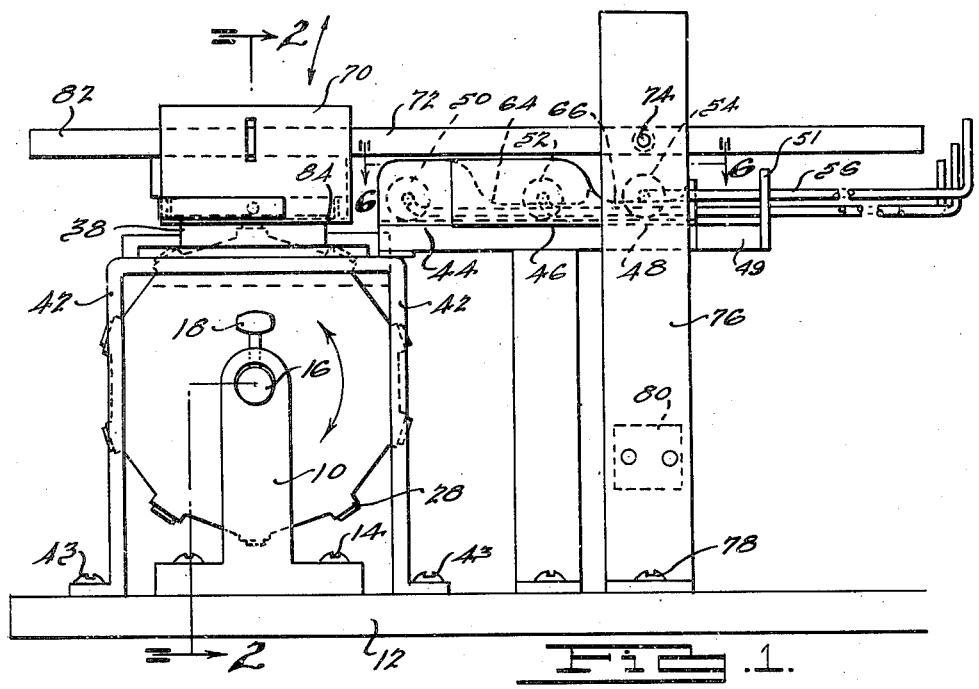
Fig. 1 is a side elevation of a device embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the drawings, it will be observed that my improved price ticket printer embodies a pair of spaced standards 10 secured to a base 12 in any suitable manner as by means of fasteners 14. The standards 10 are provided with apertures to receive a shaft 16 clamped in the standard 10 as by means of thumb screws 18.

Figures 2, 3:
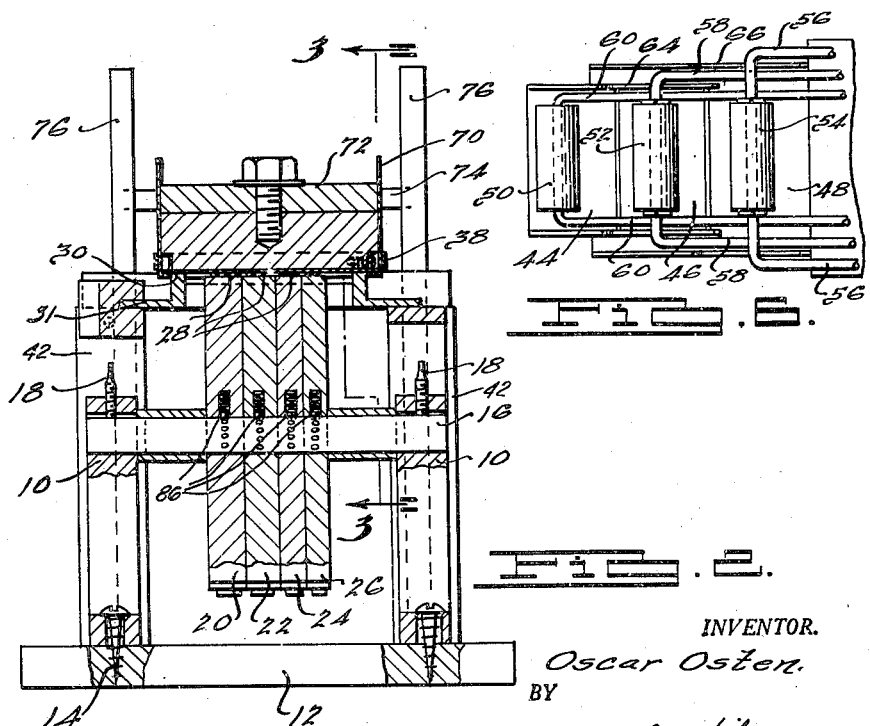
Fig. 2 is a side sectional view taken substantially on the line 2—2 of Fig. 1, looking in the direction of the arrows.
Fig. 3 is a vertical sectional view taken substantially on the line 3—3 of Fig. 2, looking in the direction of the arrows.

A plurality of independently operable wheels 20, 22, 24 and 26 are rotatably mounted on the shaft 16 and are provided with ten successively spaced numerals 28, reading from 0 to 9 adapted to selectively align with an aperture in a frame 30. The frame 30, best illustrated in Fig. 4 is secured to a member 31 (Fig. 2 by means of spaced hinge members 38 to permit the frame to oscillate to a vertical position to permit adjusting the price indicating numerals as hereinafter described. The frame 30 is adapted to surround the price indicating numerals 28 carried by the wheels 20, 22, 24 and 26 to provide an ornamental design 32 of any suitable configuration on the price ticket being printed. Spaces 34 and 36 positioned for example above and below the price indicating numerals 28 are available for the reception of type to indicate the name of the store, or an indication as to the source or origin of the articles being displayed or for any other desired purpose.

The ornamental design portion 32 and the type appearing in the spaces 34 and 36 are carried by the frame 30. One side of the frame 30 is hinged as illustrated at 38 to align the central aperture 40 with the numerals 28 carried by the respective wheels 20, 22, 24 and 26 as illustrated in Fig. 4. The member 31 carrying the spaced hinge members 38 carrying the frame 30 is carried by a pair of spaced standards 42 positioned to overlie the numeral carrying wheels 20, 22, 24 and 26 and to be suitably secured to the base 12 as by means of fasteners 43.

A plurality of spaced ink pads 44, 46 and 48 adapted to receive ink of different colors are positioned substantially in alignment with the top of the frame 30 and the numerals 28 carried by the wheels 20, 22, 24 and 26 and projecting through the aperture 40. A plurality of rollers 50, 52 and 54 are carried by spaced actuating members 60, 58 and 56 respectively. The members 58 and 56 for actuating the rollers 52 and 54 move on spaced guides 64 and 66 respectively to permit each of the rollers 50, 52 and 54 to engage only its associated ink pad 44, 46 and 48 respectively, and to maintain it out of contact with the other ink pads. The members 56, 58 and 60 for actuating the rollers 54, 52 and 50 respectively extend along a platform member 49 supporting the ink pads 44, 46 and 48, are prevented from lateral displacement by means of upright guide members 51 carried by the platform member 49. As clearly shown in Fig. 1, guide 64 is of cam-like formation and is operative to lift roller 52 as the latter is moved forwardly by its actuating member 58, with the result that roller 52 is positively prevented from contacting either roller 50 or ink pad 44. And guide 66 is likewise of cam-like formation and thus adapted to lift roller 54 so that the latter cannot contact either of the other two rollers 50 and 52 or either of the ink pads 44 and 46. Thus, each ink roller can contact only its own individual ink pad and cannot become fouled by contact with either of the other ink rollers. Each of the rollers 50, 52 and 54 is of suitable diameter so that its circumference is somewhat less than the length of its associated ink pad 44, 46 and 48 and the guides 64 and 66 prevent each of the rollers from contacting any of the other ink pads. Different color ink is applied to each of the pads 44, 46 and 48 such for example as inks of blue, green or pink, etc., to readily provide cards of harmonizing colors for any color scheme. It will be apparent that any desired number of ink pads and associated rollers can be provided and that any desired color of inks can be used on the ink pads.

A card carrying block 70 is mounted on a manually actuated lever 72 pivoted at 74 on spaced supports 76 secured to the base 12 as by means of suitable fasteners 78, a brace 80 being provided between the supports 76 to rigidify the structure. The front end 82 of the lever 72 may be grasped to move the block 70 about the pivot 74 toward the elevated position illustrated in Fig. 5. One of the rollers 50, 52 or 54 may then be moved over its associated inking pads 44, 46 and 48 and thereafter be moved across the card contacting portion of the frame 30 and numerals 28 projecting through the aperture 40 to apply ink thereto. The block 70 is provided with a clamp 84 to receive a price ticket to be printed. The price ticket is inserted and held by the clamp 84 of the block 70, and the block 70 is lowered to the printing position illustrated in Fig. 1 by the actuation of the front portion 82 of the lever 72. The desired price notation is impressed from all of the wheels 20, 22, 24 and 26 onto the face of the card, together with the ornamental design 32 and the name of the store or an indication of the origin of the goods appearing in the spaces 34 and 36.

Spaced detents 86 may be interposed between the shaft 16 and the wheels 20, 22, 24 and 26 to insure accurate alignment of the numerals 28 with each other in the slot 40 of the member 30.

The frame 30 is moved manually to the elevated position on its hinges 38 when the numerals 28 on the wheels 20, 22, 24 and 26 are to be set to print a price ticket having a different price indicated thereon. When the desired price has been set by positioning the wheels 20, 22, 24 and 26 in the proper positions the detents 86 hold the wheels accurately in adjusted positions, and the frame 30 is again lowered manually into position to project the numerals 28 through the aperture 40 in alignment with the top of the frame 30. A plurality of frames 30 having different store names or other indications to designate the origin of goods, or different ornamental designs may be readily substituted by removing the pin of the hinge 38. If desired a clip may be provided to be snapped into place in the frame 30 to facilitate changing the ornamental design of the price ticket.

I claim:

In a ticket printing machine wherein tickets are printed from type wheels rotatably mounted on a support, selective inking means for said type wheels mounted on said support laterally of said type wheels, said inking means comprising a plurality of ink pads mounted on a platform in substantially a common plane, a plurality of ink rollers each associated with a respective ink pad, actuating means for each of said rollers, means on said platform for guiding said actuating means against displacement when moved to and from ink applying and ink receiving position respectively over said type wheels and ink pads, cam means on said platform for lifting and guiding said rollers and their respective actuating means to such an elevation that each roller and its actuating means is caused to clear all other intervening rollers and ink pads in moving toward and away from the type, said cam means being positioned on said platform to lift all rollers and their respective actuating means except that which is associated with the roller and ink pad nearest the type.

OSCAR OSTEN.

REFERENCES CITED

The following references are of record in the file of this patent:

UNITED STATES PATENTS

| Number | Name | Date |
|---|---|---|
| Re. 13,400 | McCoy | Apr. 9, 1912 |
| 79,043 | Wood | June 16, 1868 |
| 348,211 | Hill | Aug. 31, 1886 |
| 449,444 | Hall | Mar. 31, 1891 |
| 632,322 | Orloff | Sept. 5, 1899 |
| 758,816 | Briggs | May 3, 1904 |
| 1,032,769 | Post | July 16, 1912 |
| 1,045,340 | Supplee | Nov. 26, 1912 |
| 1,261,163 | Putnam | Apr. 2, 1918 |
| 1,537,191 | Reynolds | May 12, 1925 |
| 1,726,575 | Luedtke | Sept. 3, 1929 |
| 1,862,529 | Dickman | June 14, 1932 |